United States Patent [19]

Tenny

[11] 4,419,247

[45] Dec. 6, 1983

[54] METHOD OF REMOVING SOLUBLE SULFIDE RESIDUE FROM SCRUBBER WATER WASTE

[76] Inventor: Alfred M. Tenny, 1335 Hickory Rd., Homewood, Ill. 60430

[21] Appl. No.: 261,944

[22] Filed: May 8, 1981

[51] Int. Cl.³ ............................................... C02F 1/58
[52] U.S. Cl. .................................... 210/726; 210/919
[58] Field of Search ................ 210/716, 919, 723, 726

[56] References Cited

U.S. PATENT DOCUMENTS 2,679,537  5/1954  Knowlton ..................... 210/919 X
3,736,239  5/1973  George et al. ................. 210/919 X

FOREIGN PATENT DOCUMENTS 701956  12/1979  U.S.S.R. .............................. 210/919

*Primary Examiner*—Thomas G. Wyse
*Attorney, Agent, or Firm*—George H. Gerstman

[57] ABSTRACT

Soluble sulfide residue, and small amounts of cyanide and oil, can be removed from scrubber water waste, particularly such waste produced by the process of manufacturing polyolefins from natural gas, by adding to the scrubber water waste a pickle acid waste, typically from steel operations, in an amount containing sufficient dissolved ionic iron to essentially completely react with all sulfide present and to precipitate it as iron sulfide. The cyanide ion can react to form iron ferrocyanide, which is substantially coprecipitated with the iron sulfide. Small amounts of oil present can also be coprecipitated.

2 Claims, No Drawings

METHOD OF REMOVING SOLUBLE SULFIDE RESIDUE FROM SCRUBBER WATER WASTE

BACKGROUND OF THE INVENTION

Scrubber water waste is a dilute caustic soda (sodium hydroxide) and water solution effluent waste which is formed, for example, in commercial processes for the manufacture of polyolefins such as polypropylene and particularly the step of cracking condensates from natural gas.

After use, the scrubber water waste presents a significant disposal problem since it is highly alkaline, usually containing approximately 3 to 8 percent by weight of sodium hydroxide. Also, scrubber water wastes usually contain soluble sulfides, typically in the form of sodium sulfide in a concentration of about 0.1 to 2 percent by weight, as well as sodium carbonate.

A serious problem with respect to the sodium sulfide in the scrubber water waste is that upon neutralization of the waste liquids, the sodium sulfide can be converted under slightly acidic conditions into hydrogen sulfide, which is a highly toxic and noxious gas with a bad odor. Accordingly, disposal of the scrubber water waste is difficult, because it is initially corrosive, while after neutralization it may give off the toxic and noxious aroma of hydrogen sulfide. Accordingly, it cannot be desirably disposed of in a waterway, or in a landfill, without problems.

Similarly, scrubber water wastes may contain cyanide ion, typically sodium cyanide in a concentration on the order of 0.001 to 0.0001 percent by weight. This highly toxic material creates further problems in the disposal of scrubber water wastes.

Likewise, small amounts of oil are found in the scrubber water waste. The oil requires removal from the effluent for disposal in order to avoid damage to the environment.

In accordance with this invention, a process is provided by which the scrubber water waste is converted from an unwanted material which is highly harmful to the environment if released in raw form, into an essentially sulfide and cyanide-free caustic soda solution which may have commercial value in its own right, so that the method of this application can turn waste material into a valuable industrial product under preferred circumstances.

Alternatively, the scrubber water waste may be utilized while being disposed of to recover dissolved metals in various waste products, such as copper, zinc, and iron, and to convert them into a form where they may be resmelted into valuable pure metal again. At the same time the scrubber water waste may also be used to neutralize acid wastes.

DESCRIPTION OF THE INVENTION

In accordance with this invention, soluble sulfide residue may be removed from scrubber water waste by adding to the scrubber water waste an acid waste in an amount containing sufficient dissolved ionic metal such as zinc, copper, and/or iron to essentially completely react with all sulfide ion present and to precipitate it as an insoluble metal sulfide.

One usable acid waste is pickle acid waste. Pickle acid waste is the effluent waste which results from pickle acid steel cleaning operations and similar processes, primarily utilized by the steel industry. Pickle acid wastes are water solutions which typically contain either hydrochloric or sulfuric acid in an amount of about 0.5 to 15 percent by weight. One typical pickle acid waste formulation contains less than 10 and preferably about 5 percent by weight of hydrochloric acid, and ferrous chloride in a concentration to provide about 4 to 10 weight percent of ferrous ions. Another type of pickle acid waste may contain about 3 percent by weight of sulfuric acid, and ferrous sulfate in a concentration to provide about 5 percent by weight of ferrous ions. It is generally preferred to select a minimum acid content and a maximum ionic iron content in the preferred pickle acid wastes for use herein, if it is desired to recover and sell the caustic soda solution of scrubber water waste.

Other acid wastes which may be used in this invention as a preferably partial or complete substitute for pickle acid waste includes copper etchant solution waste, in which the copper ion is present in a solution of typically hydrochloric, sulfuric, or nitric acid from commercial and other etching processes.

Similarly, spent acid wastes from galvanizing processes may contain zinc ions, usually in the form of zinc sulfate or zinc chloride.

Likewise, other acid wastes may also be used which contain metal ions which react with the sulfide ion of the scrubber water waste to form an insoluble precipitate, thus removing from solution both the sulfide and the metal ion, for subsequent recovery of the metal ion or disposal in a less environmentally damaging form.

However, it is generally preferred to use at least some iron-containing pickle acid waste to facilitate cyanide removal.

As one possible result of the process of this invention, sufficient pickle acid waste or other acid waste is provided to precipitate essentially all sulfide present, along with essentially all cyanide ions and oil, which usually coprecipitates with the resulting iron or other metal sulfide, the oil being adsorbed. The resulting product may be filtered, centrifuged, or decanted as desired to separate the precipitate solids from the supernatant. The supernatant liquid typically constitutes a purified solution of caustic soda, preferably containing at least 2 percent by weight of caustic soda, only a trace of soluble ionic iron, and some chloride or sulfate ion or the like, depending on the original acid present in the pickle acid. This caustic soda solution can find commercial industrial use in many processes requiring caustic soda.

The precipitated iron sulfide, with small amounts of iron ferrocyanide formed from the cyanide ions, oil, and related materials is a relatively innocuous solid, which may be stored in landfill disposal sites.

A preferred embodiment of the method of this invention is to initially add copper etchant waste solution of the type described above to the scrubber water waste in proportions so that the sulfide ion of the scrubber water waste remains at least 10 percent in excess of the copper present. Under these circumstances, substantially all of the copper may be precipitated as copper sulfide. The presence of excess sulfide ion appears to facilitate the complete precipitation of the copper sulfide.

This relatively pure copper sulfide may be removed by filtering or centrifugation, if desired, and it is a commercially salable material to copper smelters.

It is generally preferred, depending upon the economics of the situation, to then add sufficient pickle acid waste, to remove substantially all of the remaining sulfide ion from solution prior to a filtration step to remove the copper sulfide, since a filtration step can be avoided in this manner. The resulting sulfide precipitate thus contains a major amount of copper sulfide and a minor amount of iron sulfide. Such material is also commercially salable, currently at a price somewhat less than pure copper sulfide.

In the currently preferred method of this invention, the precipitated mixture of copper sulfide and iron sulfide, containing substantially all of the sulfide ion present in the system, is filtered, centrifuged, or otherwise removed from the liquid mixture. Following this, more pickle acid waste may be added as desired to the sulfide-free mixture to precipitate iron hydroxide until the alkaline solution is neutralized. This iron hydroxide precipitate, which is generally free of sulfide ion, is another salable item to commercial iron smelters, and may be removed from the system by a typical filtration or centrifugation process. This also permits the disposal of larger amounts of pickle acid waste by the use of the alkali material in the scrubber water waste, if there is an excess of pickle liquid or other acid wastes to be disposed of.

As the result of this, a substantially neutralized effluent, substantially free of metal, sulfide, and cyanide ions, may be produced by the neutralization of the scrubber water waste with increased amounts of pickle acids and the like in that circumstance where it is not desired to sell the processed scrubber water waste as a sodium hydroxide solution, but instead to utilize it to neutralize acid wastes and to recover metals therefrom.

As a further alternative, one may add metal acid wastes such as pickle acid waste to precipitate the metal ions until the mixture is brought substantially into the acid range, for example a pH of about 3. Then the solution may be neutralized with lime or the like for reprecipitation of the metals and the precipitated metal hydroxides recovered. This provides a technique for disposing of a maximum amount of waste acid utilizing the scrubber water waste material.

Also, it is of course advantageous prior to beginning the process of this invention to decant or skim any oils which may be found in any of the waste materials processed herein.

The galvanizing acid waste such as the zinc acid wastes described above may be utilized in conjunction with or as a substitute for the copper-containing etchant acid wastes. Also, as stated before, pure iron-containing pickle acid waste may be utilized without the other types of acid wastes.

It is generally preferred to complete the sulfide precipitation step with iron-containing pickle acid waste, since copper and zinc react with sulfide ion to form a highly insoluble material, but their hydroxides are not as insoluble as the iron hydroxides. Thus it is desirable to complete the sulfide precipitation reaction with an iron-containing acid waste, and to remove the precipitate while the solution remains alkaline, to minimize the amount of soluble copper and zinc in the resulting effluent.

If desired, other sulfide-containing waste materials may be utilized herein as a substitute for the scrubber water waste specifically described herein, particularly alkaline waste materials.

Typically, other materials may be present in the scrubber water waste and the pickle acid waste including ferric ions as well as the ferrous ions, which are almost invariably present at alkaline pH, and which are believed to assist in the cyanide precipitation. Ferric and ferrous hydroxide, and ferrocyanides may also be present in the precipitate. Some sodium chloride or sulfate, and ferrous and ferric chloride or sulfate may also be found, depending on the type of pickle acid that is used. Traces of other metals and the like may also be present, and many of them can be removed by this invention.

Preferably, the scrubber water waste contains at least 3 percent by weight of caustic soda and typically about 5 to 10 percent, which can provide economic advantage in that the resulting product may constitute a commercially salable caustic soda solution, or added acid wastes may be neutralized by it.

The resulting salts formed between the acid and the caustic soda typically remain dissolved in the product of this invention, and generally are not considered to be deleterious in many industrial processes which can use the caustic soda solution product of this invention, or dangerous for disposal of the neutralized solution.

Typically, from 4 to 15 percent by weight of ionic iron is present in the pickle acid waste used, with the majority of the iron being in the ferrous form. From 5 to 10 weight percent of acid is typically present.

The invention of this application also provides the further advantage of providing a valuable use for pickle acid wastes, which eliminates the disposal problem of those materials, as well as the disposal problem of scrubber water wastes and the like.

Other wastes of equivalent composition may be used in this invention as substitutes for the above-described wastes.

The above disclosure, and the following example, are offered for illustrative purposes only, and are not intended to limit the scope of the invention of this application, which is as defined in the claims below.

EXAMPLE

Scrubber water waste from the manufacture of polyolefins by natural gas was provided for purification, containing typically 3 to 8 percent by weight of sodium hydroxide, 1.225 parts per million of cyanide ion, about 1 percent by weight of sulfide ion, and some oils.

Typical samples of pickle acid waste contain the following, as shown in Table 1 below:

TABLE 1

|  | First Pickle Acid Waste Sample | Second Pickle Acid Waste Sample |
| --- | --- | --- |
| pH | 1.90 | 2.40 |
| Lead (ppm.) | 5.71 | 5.60 |
| Total iron (ppm.) | 87,273.00 | 46,047.00 |
| Copper (ppm.) | 138.90 | 25.30 |
| Chromium (ppm.) | 3.28 | 22.75 |
| Zinc (ppm.) | 10.00 | 58.09 |
| Nickel (ppm.) | 27.69 | 157.70 |
| Wt. percent ferrous iron | 9.44 | 5.25 |

TABLE 1-continued

| | First Pickle Acid Waste Sample | Second Pickle Acid Waste Sample |
|---|---|---|
| Wt. percent acid | 5.62 (HCl) | 7.28 ($H_2SO_4$) |

When a typical pickle acid waste like one of the above-described materials is mixed with the scrubber water waste described above, iron sulfide is precipitated, along with other metal sulfides, to reduce both the presence of sulfide ion and to neutralize acid. However, typically the solution remains alkaline to precipitate the metals until all sulfide is precipitated.

At the point at which substantially all sulfide ions have been precipitated, and the precipitate filtered out of the solution, the filtrate may still have a pH of 12.4 in one typical instance, about 0.1 ppm. of sulfide ion, a total of 88 ppm. of organic carbon, but only 1 ppm. of fat, oil and grease, 0.27 ppm. of lead, 1.02 ppm. of iron, 0.05 ppm. of copper, 0.03 ppm. of chromium, 0.58 ppm. of zinc, and 0.17 ppm. of nickel. Thus it can be seen that practically all of the soluble metal ions, sulfide, and cyanide have been removed by the process of this invention.

While such an alkaline solution is commercially salable for various industrial uses, it may be also used to further recover iron and other metals from additional pickle acid waste. Upon addition of further pickle acid waste, iron and other metal ions are precipitated as the hydroxide, with other trace metal ions being frequently coprecipitated with the iron so that the concentration of metal ions in the filtrate is greatly reduced. The filtrate thus may be disposed of in an environmentally safe manner with greater ease, while the filter residue may be resmelted to recover the iron, or alternatively disposed of as a solid waste without high toxicity and reduced environmental danger.

If desired, the scrubber water waste may be initially treated with an acid zinc galvanizing solution waste or copper-containing acid etchant solution waste to initially precipitate zinc and copper sulfides. In this instance, it is preferred for at least about the last 10 percent of the final dissolved sulfide ion residue to be precipitated by means of an iron-containing acid waste for more complete precipitation. As previously stated, the precipitated zinc or copper sulfide, optionally admixed with a small amount of the precipitated iron sulfide, may be separated and sold for smelting.

That which is claimed is:

1. The method of removing soluble sulfide residue from scrubber water waste and the like which comprises adding to said scrubber water waste an acidic copper waste in an amount whereby the copper ion added is sufficient to precipitate no more than 90 percent of the sulfide ion present, removing the precipitated copper sulfide, and thereafter adding a pickle acid waste containing ferrous ions in an amount sufficient to essentially completely react with all sulfide present and to precipitate as an iron-copper sulfide mixture.

2. The method of removing soluble sulfide residue from scrubber water waste and metal ions from liquid acid waste which comprises adding to said scrubber water waste an acidic copper waste solution in an amount sufficient to remove by precipitation no more than 90 percent of the sulfide ion present; removing the precipitate; adding pickle acid waste containing ferrous ions to essentially completely react with all sulfide present and to precipitate it as an iron-copper sulfide; removing said precipitate and thereafter adding additional iron-containing pickle acid waste to precipitate iron hydroxide, and thereafter removing said precipitated iron hydroxide from the system.

* * * * *